United States Patent
Yu et al.

(10) Patent No.: US 12,304,478 B2
(45) Date of Patent: May 20, 2025

(54) METHOD AND APPARATUS FOR CONTROLLING LANE CHANGING, AND STORAGE MEDIUM

(71) Applicant: APOLLO INTELLIGENT CONNECTIVITY (BEIJING) TECHNOLOGY CO., LTD., Beijing (CN)

(72) Inventors: Ning Yu, Beijing (CN); An Pan, Beijing (CN); Zhiqi Feng, Beijing (CN); Lin Meng, Beijing (CN); Yongchen Li, Beijing (CN); Pingping Wu, Beijing (CN); Yaling Zhang, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 254 days.

(21) Appl. No.: 18/069,391

(22) Filed: Dec. 21, 2022

(65) Prior Publication Data
US 2023/0202471 A1 Jun. 29, 2023

(30) Foreign Application Priority Data
Dec. 22, 2021 (CN) .......................... 202111582543.5

(51) Int. Cl.
*B60W 30/095* (2012.01)
*B60W 30/18* (2012.01)

(52) U.S. Cl.
CPC .. *B60W 30/0956* (2013.01); *B60W 30/18163* (2013.01); *B60W 2510/20* (2013.01);
(Continued)

(58) Field of Classification Search
CPC ....... B60W 30/0956; B60W 30/18163; B60W 2510/20; B60W 2520/14; B60W 2552/10;
(Continued)

(56) References Cited

U.S. PATENT DOCUMENTS 10,118,610 B2 * 11/2018 Deng ............... B60W 10/20
2018/0281857 A1 * 10/2018 Choi ................. B62D 6/003
(Continued)

FOREIGN PATENT DOCUMENTS

CN 107145147 A 9/2017
CN 109270933 A 1/2019
(Continued)

OTHER PUBLICATIONS

Notice of Reasons for Refusal issued in Japanese Application No. 2022-204785 mailed on Dec. 5, 2023 (16 pages).
(Continued)

*Primary Examiner* — Calvin Cheung
(74) *Attorney, Agent, or Firm* — Osha Bergman Watanabe & Burton LLP

(57) ABSTRACT

A method and an apparatus for controlling lane changing, and a storage medium includes: predicting a target pose of a vehicle changed to a second lane based on a current pose of the vehicle on a first lane in response to a trigger of changing the vehicle from the first lane to the second lane; and determining a lane changing preparation pose of the vehicle on the first lane based on the target pose and at least one parameter of the vehicle.

15 Claims, 7 Drawing Sheets

(52) U.S. Cl.
CPC ..... *B60W 2520/14* (2013.01); *B60W 2552/10* (2020.02); *B60W 2554/802* (2020.02)

(58) Field of Classification Search
CPC ....... B60W 2554/802; B60W 2754/30; B60W 60/00272; B60W 2520/06; B60W 2530/00; B60W 2552/53; B60W 2554/4041; B60W 2556/40; B60W 50/0097; B60W 40/10; B60W 2520/00; B60W 30/08; B60W 40/12; B60W 60/001; B60W 2050/0005; G06F 9/06
See application file for complete search history.

(56) References Cited

U.S. PATENT DOCUMENTS

| | | | |
|---|---|---|---|
| 2019/0071092 A1 | 3/2019 | Ma et al. | |
| 2019/0071093 A1* | 3/2019 | Ma | G05D 1/0214 |
| 2019/0100211 A1* | 4/2019 | Liu | B60W 60/00276 |
| 2019/0263401 A1* | 8/2019 | Yoo | B60W 10/04 |
| 2020/0241547 A1* | 7/2020 | Hashimoto | B60W 30/18163 |
| 2020/0406969 A1* | 12/2020 | Ersal | B60W 10/184 |
| 2021/0262808 A1 | 8/2021 | Wang et al. | |
| 2021/0269038 A1 | 9/2021 | Lu et al. | |

FOREIGN PATENT DOCUMENTS

| | | |
|---|---|---|
| CN | 110727266 A | 1/2020 |
| CN | 112660147 A | 4/2021 |
| CN | 113479217 A | 10/2021 |
| CN | 113486531 A | 10/2021 |
| DE | 102006043149 A1 | 3/2008 |
| JP | 2011098614 A | 5/2011 |
| JP | 20130122743 A | 6/2013 |
| JP | 2017220028 A | 12/2017 |
| WO | 2019204053 A1 | 10/2019 |

OTHER PUBLICATIONS

Office Action issued in Chinese Application No. 202111582543.5, mailed on May 9, 2023 (17 pages).
Extended European Search Report issued in European Application No. 22214781.1, mailed on May 22, 2023 (7 pages).
"Dubins path: Difference between revisions;" Wikipedia; May 11, 2023; pp. 1-3 (3 pages).

* cited by examiner

METHOD AND APPARATUS FOR CONTROLLING LANE CHANGING, AND STORAGE MEDIUM

CROSS REFERENCE TO RELATED APPLICATION

This application is based on and claims priority to Chinese patent application No. 202111582543.5, filed on Dec. 22, 2021, the entire content of which is hereby introduced into this application as a reference.

TECHNICAL FIELD

The present disclosure relates to a field of artificial intelligence (AI) technologies, particularly to a field of an autonomous driving technology, and specifically to a method and an apparatus for controlling lane changing, and a storage medium.

BACKGROUND

There are two typical driving scenes including driving on a current lane and changing lanes where a vehicle is driving in a process of an autonomous vehicle performing a task. The vehicle may be affected by other vehicles or other obstacles on the lane in a process of changing lanes.

SUMMARY

A method and an apparatus for controlling lane changing, and a storage medium are provided in the disclosure.

According to an aspect of the present disclosure, a method for controlling lane changing is provided. The method includes: predicting a target pose of a vehicle changed to a second lane based on a current pose of the vehicle on a first lane in response to a trigger of changing the vehicle from the first lane to the second lane; and determining a lane changing preparation pose of the vehicle on the first lane based on the target pose and at least one parameter of the vehicle.

According to another aspect of the present disclosure, an apparatus for controlling lane changing is provided. The apparatus includes at least one processor; and a memory communicatively connected to the at least one processor. The memory is stored with instructions executable by the at least one processor, the instructions are executed by the at least one processor, to cause the at least one processor to perform: predicting a target pose of a changed changing to a second lane based on a current pose of the vehicle on a first lane in response to a trigger of changing the vehicle from the first lane to the second lane; and determining a lane changing preparation pose of the vehicle on the first lane based on the target pose and at least one parameter of the vehicle.

According to another aspect of the present disclosure, a non-transitory computer-readable storage medium stored with computer instructions is provided, the computer instructions are configured to perform: predicting a target pose of a changed changing to a second lane based on a current pose of the vehicle on a first lane in response to a trigger of changing the vehicle from the first lane to the second lane; and determining a lane changing preparation pose of the vehicle on the first lane based on the target pose and at least one parameter of the vehicle.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Figure 1:
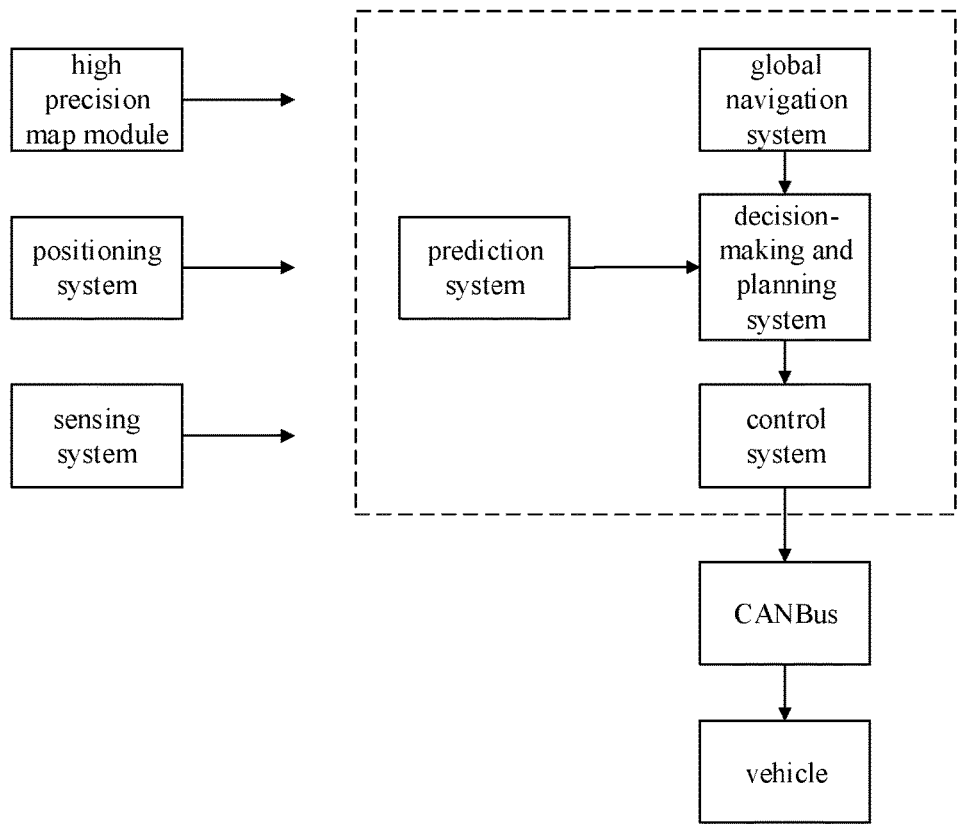
FIG. 1 is a block diagram illustrating a structure of an autonomous driving system according to a first embodiment of the present disclosure.

FIG. 1 is a block diagram illustrating a structure of an autonomous driving system according to a first embodiment of the disclosure.

As illustrated in FIG. 1, an autonomous driving system may include the following core modules or systems, such as, a high precision map module, a positioning system, a sensing system, a prediction system, a global navigation system, a decision-making and planning system and a control system.

The high precision map module is configured to provide a high precision map service.

The positioning system is configured to provide a high precision positioning service. For example, a millimeter-level positioning service or a centimeter-level positioning service.

The sensing system may include hardware devices such as a camera, a lidar, a millimeter wave radar, and an ultrasonic radar. The sensing system may sense information about an obstacle through the hardware devices in combination with a preset obstacle detection algorithm, to provide an all-round environmental perception service for an autonomous vehicle.

The prediction system is mainly configured to infer motion trajectories of the obstacle at a future time point by taking data output by the upstream sensing system as input data of a system, extracting historical motion parameters of the obstacle, and in combination with means, such as, Kalman filtering, neural network. The motion trajectories may be provided to a downstream system or module.

The global navigation system is configured to obtain an optimal global navigation path satisfying a performance evaluation index based on an initial position and a target position of the vehicle in combination with a topology of a road network through a global path search algorithm.

The decision-making and planning system is configured to provide strategies of the vehicle avoiding the obstacle and changing lanes; and to provide path planning, speed planning and other services.

The control system is configured to control the vehicle to drive based on the planned trajectory provided by the decision-making and planning system, and perform longitudinal and lateral tracking on the trajectory of the vehicle.

The autonomous driving system may transmit a control signal of the control system to the vehicle through a CAN (Controller Area Network) bus to control the vehicle.

Some scenes may be completed through changing lanes in a process of the autonomous driving vehicle performing a task. Lane changing may be classified into actively changing lanes and passively changing lanes from a trigger reason. Actively changing lanes may be determined based on an initial position and a final position of the vehicle, a road network structure and other parameters. Passively changing lanes may be affected by the obstacle in addition to being affected by the above parameters in the process of actively changing lanes.

It is appreciated to determine a timing and a position of changing lanes in the process of changing lanes. An unreasonable timing or position of changing lanes may cause the vehicle to enter a dangerous state, for example, a risk of collision with other obstacles. Therefore, a lane changing decision is made in combination with information of the obstacle surrounding the vehicle, which is conducive to improving safety of changing lanes for the vehicle.

Therefore, in a process of changing lanes, a reasonable pose of the vehicle waiting for changing lanes in two situations of parking or keeping driving on a current lane may be determined in comprehensive consideration of the road structure and the obstacle vehicle or other obstacles on a target lane, which may be beneficial to improving a success rate of changing lanes and an experience of changing lanes, and reduce a collision risk that may occur in the process of changing lanes.

Figure 2:
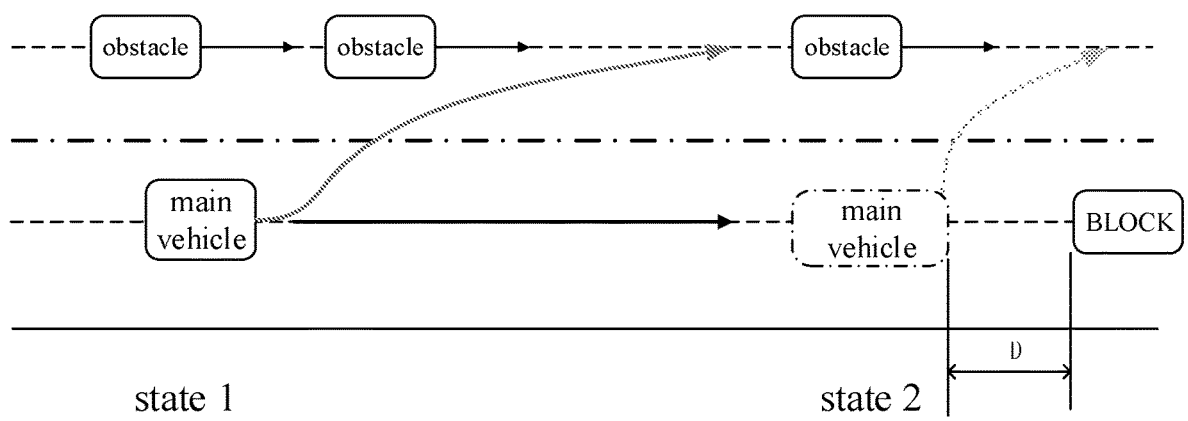
FIG. 2 is a schematic diagram illustrating a scene where a vehicle is blocked according to a second embodiment of the present disclosure.

FIG. 2 illustrates a schematic diagram of a scene where a vehicle is blocked according to a second embodiment of the present disclosure.

As illustrated in FIG. 2, in a scene where a vehicle is blocked, a main vehicle triggers changing lanes at a state 1, however, there is no opportunity for the main vehicle to change lanes, and the main vehicle will gradually change to a state 2. The main vehicle may be controlled to park in order to avoid a collision with an obstacle in front BLOCK. There is a safe distance D between a parking position of the vehicle and the obstacle in front BLOCK. The vehicle will be blocked when changing lanes after starting in a case that the safe distance is too small.

Reasons of the vehicle being blocked on the current lane includes the obstacle in front blocking a lane where the vehicle is driving, and the vehicle is about to arriving at a destination of a current reference line.

The above block reasons may be summarized that there is one obstacle BLOCK in front of the vehicle. The vehicle needs to avoid the obstacle BLOCK by detouring or changing lanes. The decision of changing lanes is usually determined based on a preset rule or a trained model. However, the decision of changing lanes cannot be guaranteed to be completely accurate no matter which method is used. In particular, in a complicated traffic scene, for example, the target lane for lane changing having continuous traffic flow, the problem caused by an unreasonable decision is more obvious. Specifically, due to the presence of vehicles in front of or behind a target position (a clearance between two vehicles in the traffic flow) of the target lane, there will be a certain safety risk in changing lanes for the vehicle. The vehicle may calculate an appropriate target position in real time and evaluate the safety risk to decide whether to change lanes. The continuous traffic flow on the target lane may cause the vehicle objectively unable to merge into the target lane, or an imperfect automatic driving algorithm and other reasons may cause the vehicle to miss an optimal position or timing for changing lanes, therefore, the vehicle will continue moving forward and re-evaluate a next position and timing for changing lanes.

In the above process of changing lanes, there are the two typical problems as follows.

First, in case of safety risk on the target lane, the vehicle has never had the opportunity to merge into the target lane, and the vehicle only may continue moving along the current lane, and get closer to the obstacle in front, and finally park, and the vehicle on a parking position has a certain distance with the obstacle in front. However, since the parking position and the pose of the vehicle may be unreasonable, it is not conducive to restarting and then changing lanes to merge into the target lane for the vehicle. Finally, the vehicle may be jammed and unable to change lanes. The parking position of the vehicle may determine a distance between the vehicle and the obstacle in front. When the distance is too close, the vehicle is difficult to merge into a target lane even if turning according to a maximum turning angle of a steering wheel of the vehicle. Moreover, a parking pose of the vehicle also constrains an initial yaw angle of a trajectory for changing lanes after starting. Therefore, when the parking pose of the vehicle is unreasonable, and the longitudinal space is limited, it will increase the difficulty of changing lanes after starting for the vehicle.

Second, when there is an opportunity for the vehicle to merge into the target lane, the vehicle is kept driving straight along a center line of the current lane in the entire process of changing lanes for the vehicle at the planned path, speed and timing. When the target position suitable (the clearance between two vehicles in the traffic flow) for changing lanes occurs on the current lane, the vehicle may merge into the target lane based on the planned trajectory for changing lanes starting from the center line of the current lane. The time period consumed in the entire process of changing lanes may exceed a maintaining time period of the above clearance, the action of changing lanes for the vehicle is evaluated as having the safety risk, and the vehicle is not allowed to change lanes, and the vehicle further misses a critical clearance and timing for changing lanes.

To this end, a solution of controlling lane changing is provided in an embodiment of the disclosure. In response to a trigger of a vehicle changing lanes, a target pose of the vehicle changed to a second lane is predicted based on a current pose of the vehicle driving on a first lane, and a lane changing preparation pose of the vehicle is determined based on the target pose and at least one parameter of the vehicle. In this way, the lane changing preparation pose fully considers the current pose, the target pose and the parameter of the vehicle, so that the vehicle is controlled to change lanes based on the lane changing preparation pose in a process of changing lanes, which is beneficial to improving a success rate and safety of changing lanes for the vehicle.

For the above first problem, a solution of controlling lane changing is provided in an embodiment of the disclosure, and the vehicle may be controlled to park based on a reasonable lane changing preparation pose, which facilitates the vehicle to change to a target lane when restarting.

Figure 3:
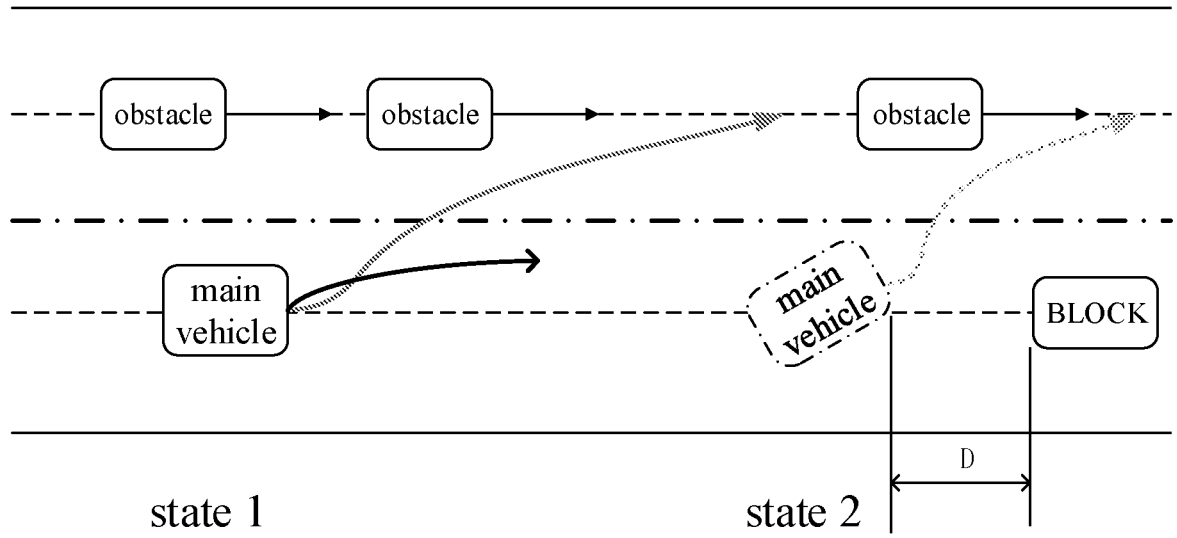
FIG. 3 is a schematic diagram illustrating a scene where a vehicle is not blocked according to a third embodiment of the present disclosure.

As an example, FIG. 3 illustrates a schematic diagram of a scene where a vehicle is not blocked according to a third embodiment of the present disclosure. As illustrated in FIG. 3, a distance D between a main vehicle and an obstacle in front is sufficient when the main vehicle parks at a state 2, and a yaw angle of the main vehicle is biased towards a target lane, which is beneficial to changing lanes for the vehicle when starting.

For the above second problem, a solution of controlling lane changing is provided in an embodiment of the disclosure. Before the vehicle is ready to change lanes and actually changing lanes, the vehicle is pre-controlled to drive close to the target lane based on the lane changing preparation pose, and an optimal clearance and a timing for changing lanes may be evaluated in real time. In this way, the vehicle deviates from a center line of a current lane and is close to the target lane, and maintains a safe distance with a boundary of an adjacent lane, which may shorten a distance and a time period of changing lanes for the vehicle. Moreover, it is helpful for vehicles on the target lane to determine a lane changing intention of a current vehicle for changing lanes and avoid the current vehicle for changing lanes in time. The above clearance for changing lanes may become larger or a more suitable clearance for changing lanes, which is more conducive to changing lanes for the vehicle. Due to shortening of a distance for changing lanes, it will be easier for the vehicle to merge into the target lane under the same size of clearance for changing lanes.

A solution of controlling lane changing provided in the disclosure will be explained in many aspects in combination with a plurality of embodiments below.

Figure 4:
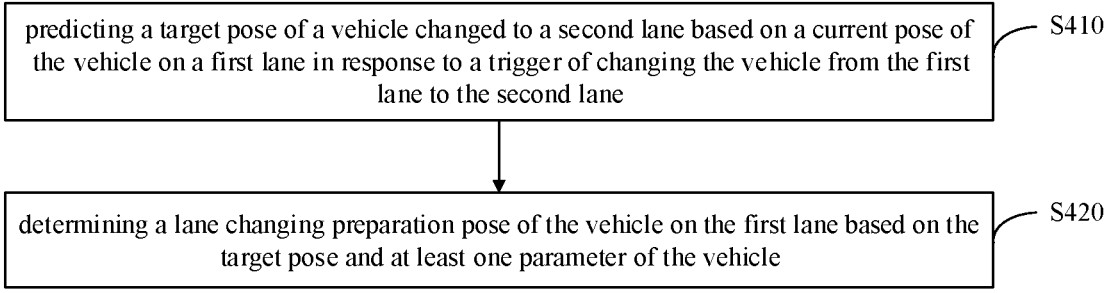
FIG. 4 is a flowchart illustrating a method for controlling lane changing according to a fourth embodiment of the present disclosure.

FIG. 4 illustrates a flowchart of a method for controlling lane changing according to a fourth embodiment of the present disclosure.

As illustrated in FIG. 4, the method for controlling lane changing may include the following blocks.

At blocks S410, a target pose of a vehicle changed to a second lane is predicted based on a current pose of the vehicle on a first lane in response to a trigger of changing the vehicle from the first lane to the second lane.

At blocks S420, a lane changing preparation pose of the vehicle on the first lane is determined based on the target pose and at least one parameter of the vehicle.

In an embodiment, the lane changing preparation pose fully considers the current pose, the target pose and the parameter of v vehicle, so that the vehicle is controlled to change lanes based on the lane changing preparation pose in the process of changing lanes, which is beneficial to improving a success rate and safety of changing lanes for the vehicle.

For example, the vehicle may be an autonomous vehicle. A trigger of the vehicle changing lanes may be based on a request of a user, for example, when the vehicle turns on a left-turn signal to indicate changing lanes towards left, or when the vehicle turns on a right-turn signal to indicate changing lanes towards right. The vehicle changing lanes may be triggered to avoid an obstacle in front when there is an obstacle in front of the vehicle.

For example, the first lane may be a lane where the vehicle is currently driving. The second lane may be a target lane where the vehicle is to be changed to.

For example, in a process of triggering the vehicle to change lanes, the target pose of the vehicle may change as the vehicle continues moving forward. Therefore, the target pose of the vehicle changed to the second lane may be predicted based on the current pose of the vehicle on the first lane.

For example, in the above prediction process, the target pose may be predicted in combination with a prediction trajectory of a surrounding obstacle, which is beneficial to improving an accuracy of predicting the target pose.

For example, a plurality of target poses may be predicted at each time point, and the vehicle may have different collision risk values when changing lanes according to different target poses. Any target pose with a collision risk value meeting a predetermined threshold may be selected.

For example, the pose may include a coordinate position and a yaw angle of the vehicle, and further may include a turning angle of a steering gear of the vehicle, an angular speed corresponding to the turning angle of the steering gear, a longitudinal driving speed and a transverse driving speed of the vehicle, etc. The coordinate position of the vehicle may include a coordinate position of a center of a rear axle of the vehicle. Each of the current pose and the target pose may include a speed. The speed in the above lane changing preparation pose may be zero.

For example, determining the lane changing preparation position of the vehicle based on the target position and the parameter of the vehicle may make the vehicle safely changing lanes based on the current lane changing preparation position even after the vehicle is forced to park and then restarts.

For example, it may be determined whether there is the collision risk in the lane changing of the vehicle based on the current pose and the target pose of the vehicle and the predicted trajectory of the obstacles. It may be determined that there is the collision risk in the lane change of the vehicle in response to the collision risk value meeting the predetermined threshold. It may be determined that there is no collision risk in the lane change of the vehicle in response to the collision risk value not meeting the predetermined threshold. After changing lanes is triggered, when determining that there is the collision risk in the lane change of the vehicle, the vehicle may be controlled to park based on the predicted lane changing preparation pose to avoid a collision, which may also be conducive to changing lanes after restarting.

For example, the vehicle may temporarily park based on the lane change preparation position in response to determining that there is a collision risk between the vehicle and the obstacle in front in the process of changing lanes, which may avoid a collision with other vehicles or obstacles, and is conducive to changing lanes after restarting.

For example, the vehicle may be controlled to get close to the target lane but still drive on the current lane based on the lane changing preparation pose in the process of changing lanes.

In some embodiments, the parameters of the vehicle may include a minimum turning radius of the vehicle and at least one safe distance parameter of the vehicle. The safe distance parameters of the vehicle may include a safe distance of the vehicle to a surrounding obstacle, for example, a safe distance of the vehicle to the obstacle in front, or a safe distance of the vehicle to a lane boundary.

For example, the block S420 of determining the lane changing preparation pose of the vehicle on the first lane based on the target pose and the at least one parameter of the vehicle may include: determining the lane changing preparation pose of the vehicle on the first lane based on the target pose, the minimum turning radius of the vehicle and at least one safe distance parameter of the vehicle.

For example, the target pose may be configured to determine an approximate lane changing preparation pose of the vehicle. The minimum turning radius of the vehicle and the safe distance parameter of the vehicle enables the vehicle to change lanes safely based on the lane changing preparation pose when the vehicle restarts after parking based on the lane changing preparation pose, which may reduce a risk for lane changing.

For example, the minimum turning radius is a radius between a predetermined center of a circle and the center point of the rear axle of the vehicle when the vehicle turns at a maximum turning angle based on the predetermined center of the circle.

In some embodiments, the safe distance parameter of the vehicle at least includes a safe distance of the vehicle to the obstacle in front. Therefore, the obtained lane changing preparation position may at least avoid a collision of the vehicle with the obstacle in front when the vehicle changes lanes after temporary parking and then restarting For example, the safe distance parameter may include the safe distance of the vehicle to the obstacle in front. Determining the lane changing preparation pose of the vehicle on the first lane based on the target pose, the minimum turning radius of the vehicle and the at least one safe distance parameter of the vehicle may include: determining a minimum longitudinal distance of turning for the vehicle based on the minimum turning radius of the vehicle; determining a minimum longitudinal distance between the vehicle and the obstacle in front based on the minimum longitudinal distance of turning for the vehicle and the safe distance of the vehicle to the obstacle in front; and determining the lane changing preparation pose of the vehicle on first lane based on the minimum longitudinal distance between the vehicle and the obstacle in front and target pose.

For example, different vehicles have different minimum turning radiuses, and different minimum turning radiuses correspond to different minimum longitudinal distances of turning for the vehicle.

For example, the minimum longitudinal distance of turning for the vehicle may refer to a scalar of a longitudinal displacement of a head of the vehicle in a process of the vehicle starting to turn from straight (e.g., 0°) to 90° based on a predetermined center of a circle and taking the minimum turning radius of the vehicle as a turning radius.

For example, the safe distance of the vehicle to the obstacle in front may be a preset value, which may be determined based on historical data.

For example, the minimum longitudinal distance between the vehicle and the obstacle in front means that the vehicle may maintain a longitudinal distance of the foregoing safe distance with the obstacle in front all the time in the process of the vehicle starting to turn from straight to 90° with the minimum turning radius.

For example, a sum of the minimum longitudinal distance of turning for the vehicle and the safe distance of the vehicle to the obstacle in front may be determined as the minimum longitudinal distance between the vehicle and the obstacle in front.

For example, the minimum longitudinal distance of turning for the vehicle is $D_1$, and the safe distance of the vehicle to the obstacle in front is $D_2$, the minimum longitudinal distance between the vehicle and the obstacle in front is $D_{min}=D_1+D_2$.

For example, an approximate lane changing preparation pose of the vehicle on the first lane may be determined based on the target pose. The distance between the vehicle and the obstacle in front when the vehicle parks may be determined based on the minimum longitudinal distance between the vehicle and the obstacle in front. The lane changing preparation pose may be accurately determined based on the approximate lane changing preparation pose of the vehicle on the first lane and the distance between the vehicle and the obstacle in front when the vehicle parks.

In an implementation, the distance between the vehicle and the obstacle in front when the vehicle parks may be set based on the determined minimum longitudinal distance between the vehicle and the obstacle in front. In this way, after the vehicle restarts, in a process of the vehicle turning to change lanes, the distance between the vehicle and the obstacle in front will not become less than the minimum longitudinal distance between the vehicle and the obstacle in front, a collision of the vehicle with the obstacle in front when turning to change lanes may be avoided.

In some embodiments, the minimum longitudinal distance of turning for the vehicle may be pre-calculated. When the lane changing preparation pose of the vehicle on the first lane is determined, the pre-calculated minimum longitudinal distance of turning for the vehicle may be directly acquired.

For example, determining the minimum longitudinal distance of turning for the vehicle based on the minimum turning radius of the vehicle may include: determining a first circle tangent to a preset straight pose based on the preset straight pose of the vehicle on the first lane and the minimum turning radius of the vehicle; determining a second circle based on the center of the first circle and a farthest distance of the center of the first circle to a head of the vehicle; determining a straight line perpendicular to a speed direction corresponding to the preset straight pose and tangent to the second circle based on the second circle and the speed direction; and determining the minimum longitudinal distance of turning for the vehicle based on a perpendicular distance between the straight line and the head of the vehicle.

In an implementation, the first circle may be determined based on the preset straight pose, and the second circle may be determined by the vehicle turning with the outermost vertex of the head relative to the center of the first circle around the center of the first circle. The straight line tangent to the second circle and perpendicular to the speed direction of the straight pose may be determined in combination with the speed direction. The minimum longitudinal distance of turning for the vehicle may be accurately determined based on the perpendicular distance between the straight line and the head of the vehicle.

Figure 5:
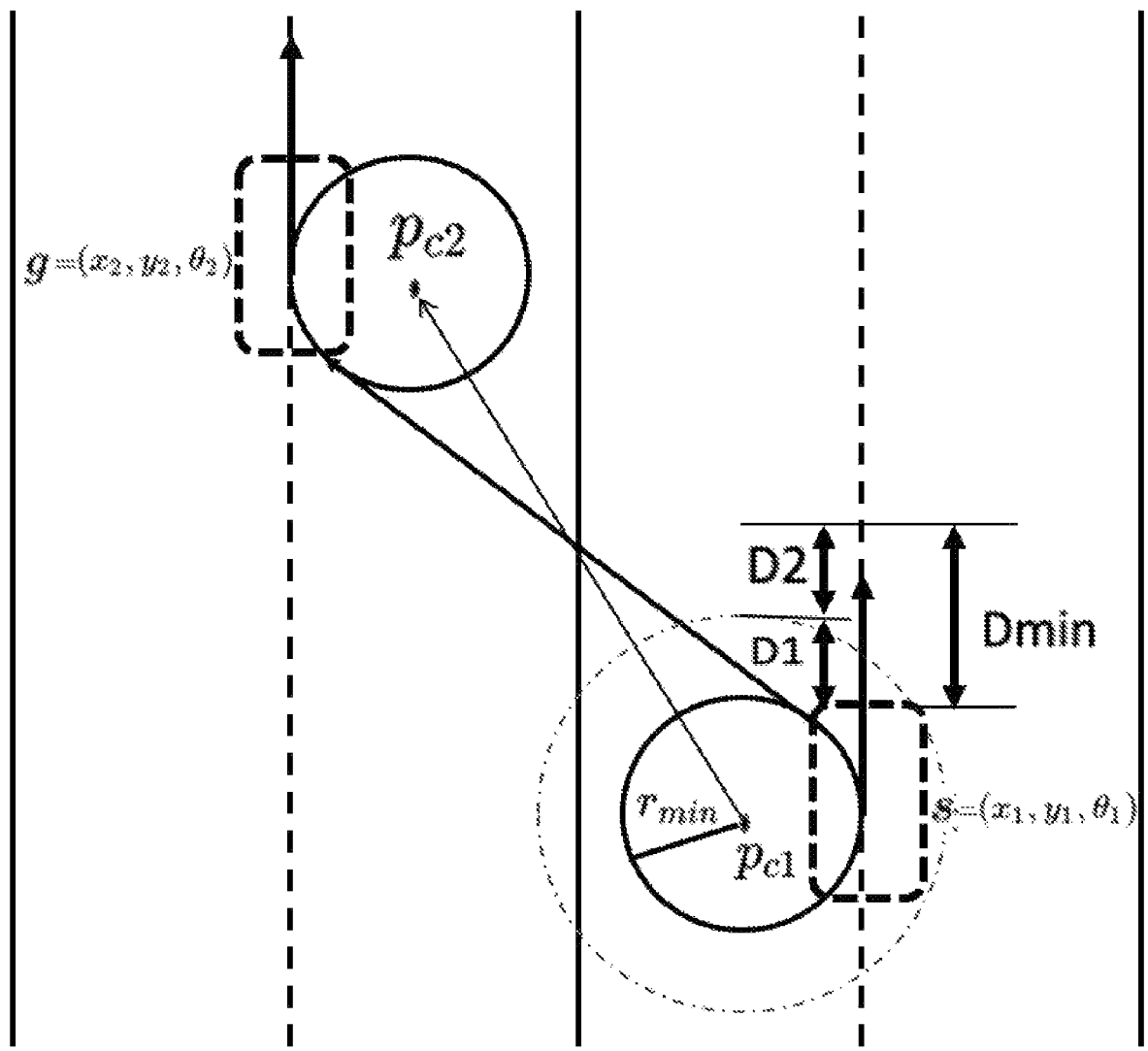
FIG. 5 is a schematic diagram illustrating a process of determining a lane changing preparation pose according to a fifth embodiment of the present disclosure.

FIG. 5 illustrates a schematic diagram of a process of determining a lane changing preparation pose according to a fifth embodiment of the present disclosure.

As illustrated in FIG. 5, the preset straight pose of the vehicle on the first lane is $(x_1, y_1, \theta_1)$, where the yaw angle $\theta_1$ is 0°; the minimum turning radius is $r_{min}$, then the first circle $p_{c1}$ has two types, that is, the center of the first circle is on the right side of the straight pose, and the center of the first circle is on the left side of the straight pose. Taking the center of the first circle on the right side for an example, the radius of the first circle $p_{c1}$ is $r_{min}$, and the center of the first circle $p_{c1}$ is at $(x_1+r_{min}, y_1)$. Taking the center of the first circle on the left side for an example, the radius of the first circle $p_{c1}$ is and $r_{min}$, the center of the first circle $p_{c1}$ is at $(x_1-r_{min}, y_1)$.

Continued from the above example, a center of the second circle is the same as the center of the second circle, and a radius of the second circle is a farthest distance between the center of the first circle and the head of the vehicle. Taking the center of the first circle on the left side of the straight pose for an example, the radius of the second circle is a distance between the center of the first circle and a vertex at the right front of the head of the vehicle. Taking the center of the first circle on the right side of the straight pose for an example, the radius of the second circle is a distance between the center of the first circle and a vertex at the left front of the head of the vehicle. As illustrated in FIG. 5, the vehicle turns based on the center of the first circle $p_{c1}$ and the radius $r_{min}$, a changing trajectory of the vertex at the right front of the head of the vehicle is a circle outside the first circle $p_{c1}$, shown as a dotted line in FIG. 5.

Continued from the above example, a yaw angle of the preset straight pose is 0°, and the speed direction of the preset straight pose is the same as a direction of the yaw angle, that is, 0°, the direction perpendicular to the speed direction corresponding to the preset straight pose is 90°. Therefore, the straight line tangent to the second circle and with an angle of 90° may be as shown in FIG. 5. The straight line is located in front of the vehicle. Further, the perpendicular distance $D_1$ between the straight line and the head of the vehicle may be determined as the minimum longitudinal distance of turning for the vehicle.

Continued from the above example, as illustrated in FIG. 5, the minimum longitudinal distance of turning for the vehicle is $D_1$, and the safe distance of the vehicle to the obstacle in front is $D_2$, the minimum longitudinal distance between the vehicle and the obstacle in front is $D_{min}=D_1+D_2$.

Continued from the above example, as illustrated in FIG. 5, the target pose of the vehicle is $(x_2, y_2, \theta_2)$. In the case of the minimum longitudinal distance between the vehicle and the obstacle in front being $D_{min}$, the lane changing preparation pose of the vehicle on the first lane may be obtained by reverse derivation with the minimum longitudinal distance $D_{min}$ between the vehicle and the obstacle in front as the safe distance parameter in combination with the target pose $(x_2, y_2, \theta_2)$ and the minimum turning radius $r_{min}$ of the vehicle. Other safe distance parameters of the vehicle, for example, a safe distance of a vehicle to a lane boundary, may be combined in the reverse derivation process.

In some embodiments, the safe distance parameters of the vehicle further may include the safe distance of the vehicle to the lane boundary. Therefore, the obtained lane changing preparation position causes the vehicle to keep a safe distance with the lane boundary when the vehicle parks, which may avoid a collision of the vehicle with vehicles on an adjacent lane.

For example, the safe distance parameters include the safe distance of the vehicle to the obstacle in front and the safe distance of the vehicle to the lane boundary. The block S420 of determining the lane changing preparation pose of the vehicle on the first lane based on the target pose, the minimum turning radius of the vehicle, and the at least one safe distance parameter of the vehicle may include: determining a third circle of the vehicle tangent to the target pose based on the target pose and the minimum turning radius of the vehicle; determining a straight lane changing trajectory of the vehicle tangent to the third circle based on the third circle, the safe distance of the vehicle to the obstacle in front and the safe distance of the vehicle to the lane boundary; and determining the lane changing preparation pose of the vehicle on the first lane based on the straight lane changing trajectory, the safe distance of the vehicle to the obstacle in front and the safe distance of the vehicle to the lane boundary.

For example, an approximate direction of the yaw angle for changing lanes may be determined based on the current pose and the target pose of the vehicle, which also determines whether a center of the third circle is located on the left or right side of the target pose. For example, when the current pose is located on the left side of the target pose, the center of the third circle is located on the left side of the target pose. When the current pose is located on the right side of the target pose, the center of the third circle is located on the right side of the target pose.

For example, a constraint relationship may be established based on the safe distance of the vehicle to the obstacle in front and the safe distance of the vehicle to the lane boundary in case of determining the third circle. That is, when the vehicle is at the lane changing preparation pose, the constraint relationship may constrain that the distance between the vehicle and the obstacle in front does not exceed a preset first safe distance, and the distance between the vehicle and the lane boundary does not exceed a preset second safe distance, and the straight lane changing trajectory of the vehicle is tangent to the third circle, which may constrain the vehicle to go straight in a process of merging into the target lane. Then, the straight lane changing trajectory of the vehicle tangent to the third circle may be obtained by solving an equation that satisfies the above constraint relationship.

For example, the straight lane changing trajectory may determine the yaw angle of the lane changing preparation pose. After parking based on such lane changing preparation pose, the vehicle may merge into the target lane based on the straight lane changing trajectory without turning when restarting. When the yaw angle of the lane changing preparation pose is determined, a coordinate position of the lane changing preparation pose is constrained in combination with the safe distance of the vehicle to the obstacle in front and the safe distance of the vehicle to the lane boundary, and the coordinate position of the lane changing preparation pose may be the coordinate of the center point of the rear axle of the vehicle.

For example, the lane changing preparation pose may be obtained by reverse derivation based on the target pose, the minimum turning radius of the vehicle and the safe distance parameters of the vehicle. Moreover, the reverse derivation process combines the safe distance of the vehicle to the obstacle in front and the safe distance of the vehicle to the lane boundary, which may avoid the collision of the vehicle with the obstacle in front when the vehicle parks and avoid the vehicle from hitting the lane boundary. Therefore, the safety of changing lanes may be improved.

For example, determining the lane changing preparation pose of the vehicle on the first lane based on the straight lane changing trajectory, the safe distance of the vehicle to the obstacle in front, and the safe distance of the vehicle to the lane boundary includes: determining a yaw angle in the lane changing preparation pose of the vehicle on the first lane based on the straight lane changing trajectory; and determining the coordinate of the center point of the rear axle in the lane changing preparation pose of the vehicle on the first lane based on the yaw angle, the safe distance of the vehicle to the obstacle in front and the safe distance of the vehicle to the lane boundary.

In an implementation, a direction of the straight lane changing trajectory may be taken as the yaw angle in the lane changing preparation pose. In this way, the vehicle is enabled to merge into the target lane by means of going straight when changing lanes after starting, and to arrive at the target pose.

Figure 6:
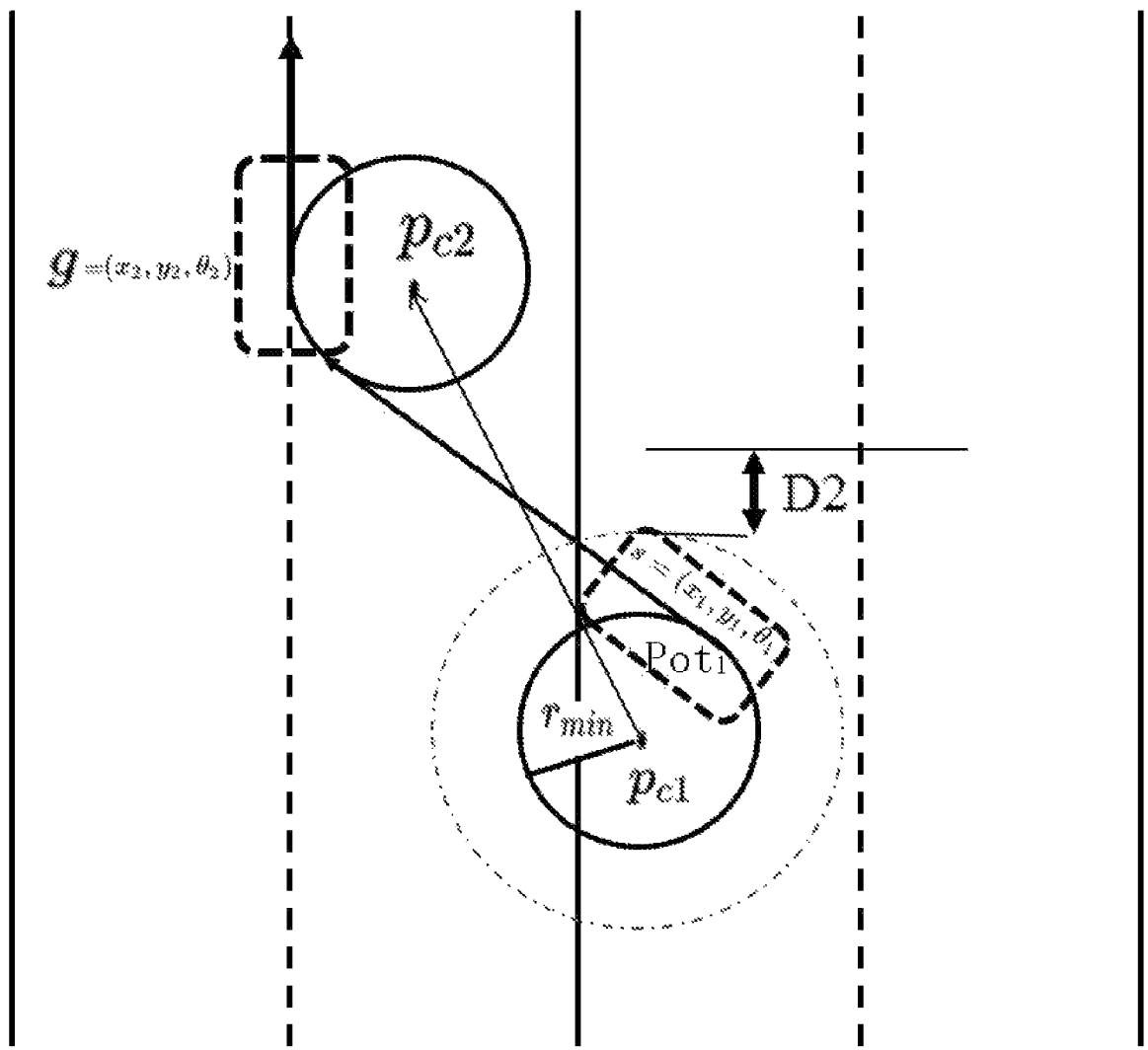
FIG. 6 is a schematic diagram illustrating a process of determining a lane changing preparation pose according to a sixth embodiment of the present disclosure.

FIG. 6 illustrates a schematic diagram of a process of determining a lane changing preparation pose according to a sixth embodiment of the present disclosure.

As illustrated in FIG. 6, the target pose is $(x_2, y_2, \theta_2)$, $\theta_2$ is 0°, and the minimum turning radius of the vehicle is $r_{min}$, then, the center of the third circle $p_{c2}$ may be determined as $(x_2+r_{min}, y_2)$. Based on the third circle $p_{c2}$, the safe distance of the vehicle to the obstacle in front is $D_2$, and the safe distance of the vehicle to the lane boundary is zero, and the vehicle is constrained to merge into the target lane by means of going straight, that is, the straight lane changing trajectory tangent to the third circle. Therefore, the straight lane changing trajectory of the vehicle satisfying the constraint relationship of the above safe distances, and tangent to the third circle may be obtained.

Continued from the above example, the yaw angle $\theta_1$ in the lane changing preparation pose $(x_1, y_1, \theta_1)$ may be determined based on the direction of the straight trajectory. Further, a coordinate $(x_1, y_1)$ of the center point of the rear axle in the lane changing preparation pose may be calculated based on the yaw angle and the constraint relationship of the above safe distances.

Another solution is further provided in an embodiment of the disclosure, which may solve the above first problem, and reduce a time for changing lanes and the collision risk in the process of changing lanes. The solution includes that, after the main vehicle triggers an operation of changing lanes but before the main vehicle actually changes lanes, the main vehicle may, based on the lane changing preparation pose, drive close to the target lane in advance, and evaluate the optimal clearance and timing for changing lanes in real time. When the clearance and timing for changing lanes have been determined, the vehicle may be controlled to change to the target lane based on both of the clearance and timing.

Figure 7:
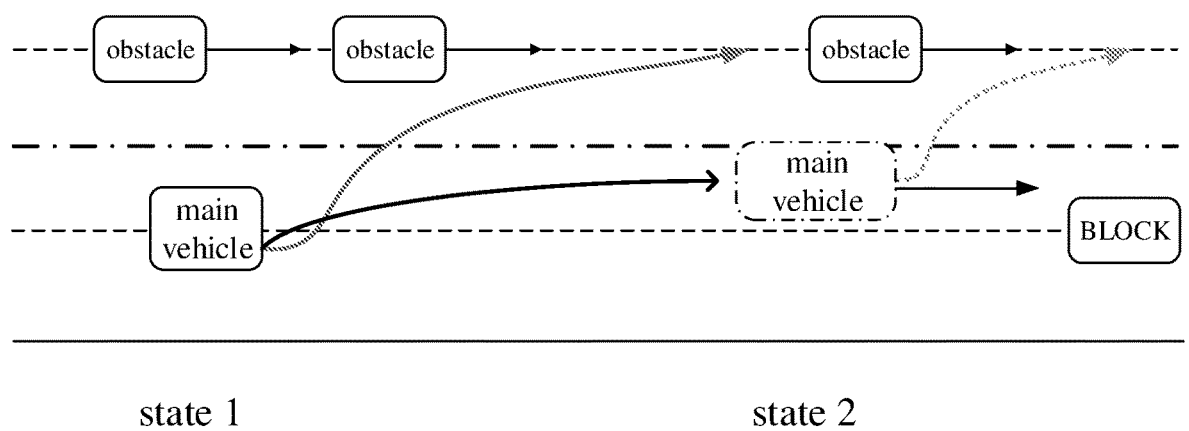
FIG. 7 is a schematic diagram illustrating a process of deciding a lane changing trajectory of a vehicle according to a seventh embodiment of the present disclosure.

FIG. 7 illustrates a schematic diagram of a process of deciding a lane changing trajectory of a vehicle according to a seventh embodiment of the present disclosure.

As illustrated in FIG. 7, at a state 1, the main vehicle is located at the center line of the current lane and goes straight. After the main vehicle triggers an operation of changing lanes but before the main vehicle actually changes lanes, the main vehicle may drive close to the target lane in advance, and evaluate the optimal clearance and timing for changing lanes in real time. At this time, the main vehicle enters a state 2, and the main vehicle is close to the lane boundary and close to the target lane.

Figure 8:
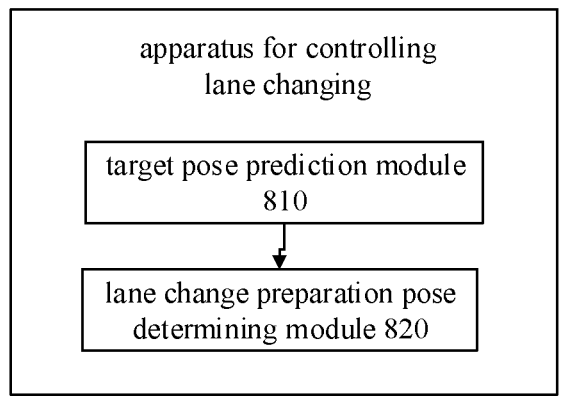
FIG. 8 is a block diagram illustrating a structure of an apparatus for controlling lane changing according to an eighth embodiment of the present disclosure.

FIG. 8 illustrates a block diagram of a structure of an apparatus for controlling lane changing according to an eighth embodiment of the present disclosure.

As illustrated in FIG. 8, the apparatus for controlling lane changing includes a target pose prediction module 810 and a lane changing preparation pose determining module 820.

The target pose prediction module 810 is configured to predict a target pose of a vehicle changed to a second lane based on a current pose of the vehicle on a first lane in response to a trigger of changing the vehicle from the first lane to the second lane; and the lane changing preparation pose determining module 820 is configured to determine a lane changing preparation pose of the vehicle on the first lane based on the target pose and at least one parameter of the vehicle.

Figure 9:
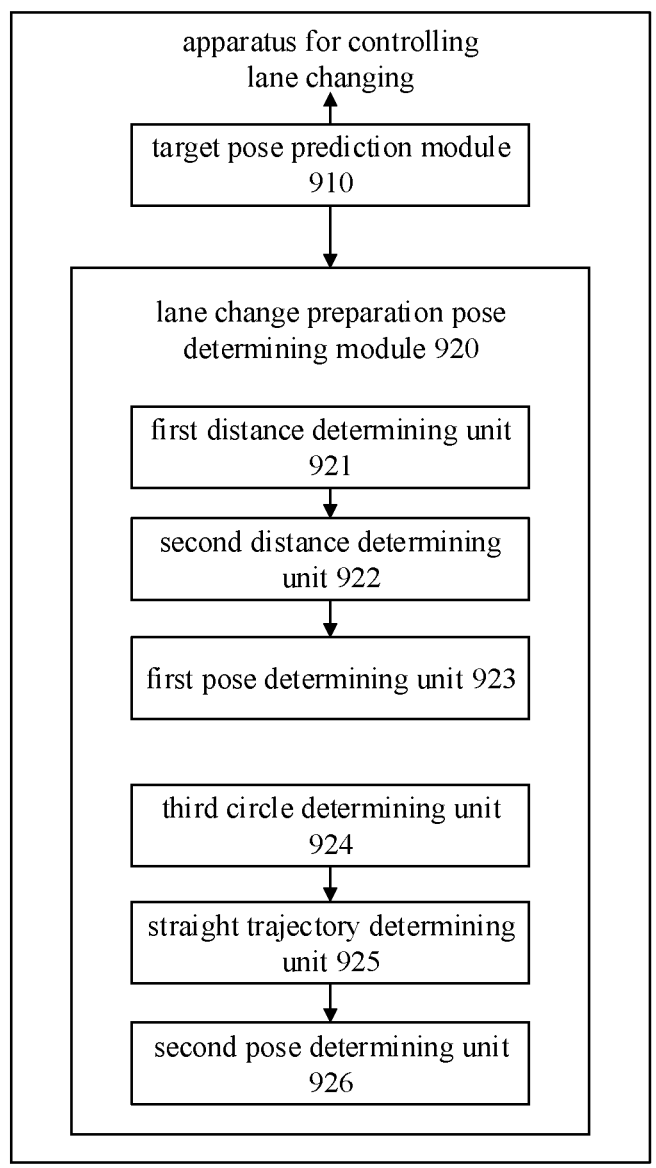
FIG. 9 is a block diagram illustrating a structure of an apparatus for controlling lane changing according to a ninth embodiment of the present disclosure.

FIG. 9 illustrates a block diagram of a structure of an apparatus for controlling lane changing according to a ninth embodiment of the present disclosure. As illustrated in FIG. 9, the apparatus for controlling lane changing includes a target pose prediction module 910 and a lane changing preparation pose determining module 920 having the same functions with the target pose prediction module 810 and the lane changing preparation pose determining module 820, which are not repeated here.

In some embodiments, as illustrated in FIG. 9, the lane changing preparation pose determining module 920 is configured to: determine the lane changing preparation pose of the vehicle on the first lane based on the target pose, a minimum turning radius of the vehicle and at least one safe distance parameter of the vehicle.

In some embodiments, the at least one safe distance parameter may include a safe distance of the vehicle to an obstacle in front.

The lane changing preparation pose determining module 920 includes a first distance determining unit 921, a second distance determining unit 922 and a first pose determining unit 923.

The first distance determining unit 921 is configured to determine a minimum longitudinal distance of turning for the vehicle based on the minimum turning radius of the vehicle; the second distance determining unit 922 is configured to determine a minimum longitudinal distance between the vehicle and the obstacle in front based on the minimum longitudinal distance of turning for the vehicle and the safe distance of the vehicle to the obstacle in front; and the first pose determining unit 923 is configured to determine the lane changing preparation pose of the vehicle on the first lane based on the minimum longitudinal distance between the vehicle and the obstacle in front and the target pose.

In some embodiments, the first distance determining module 921 is configured to: determine a first circle tangent to a preset straight pose based on the preset straight pose of the vehicle on the first lane and the minimum turning radius of the vehicle; determine a second circle based on a center of the first circle and a farthest distance of the center of the first circle to a head of the vehicle; determine a straight line perpendicular to a speed direction corresponding to the preset straight pose and tangent to the second circle based on the second circle and the speed direction; and determine a minimum longitudinal distance of turning for the vehicle based on a perpendicular distance between the straight line and the head of the vehicle.

In some embodiments, the at least one safe distance parameter may include a safe distance of the vehicle to an obstacle in front and a safe distance of the vehicle to a lane boundary. The lane changing preparation pose determining module 920 includes a third circle determining unit 924, a straight trajectory determining unit 925 and a second pose determining unit 926.

The third circle determining unit 924 is configured to determine a third circle of the vehicle tangent to the target pose based on the target pose and the minimum turning radius of the vehicle; the straight trajectory determining unit 925 is configured to determine a straight lane changing trajectory of the vehicle tangent to the third circle based on the third circle, the safe distance of the vehicle to the obstacle in front and the safe distance of the vehicle to the lane boundary; and the second pose determining unit 926 is configured to determine the lane changing preparation pose of the vehicle on the first lane based on the straight lane changing trajectory, the safe distance of the vehicle to the obstacle in front, and the safe distance of the vehicle to the lane boundary.

In some embodiments, the second pose determining module 926 is configured to: determine a yaw angle in the lane changing preparation pose of the vehicle on the first lane based on the straight lane changing trajectory; and determine a coordinate of a center point of a rear axle in the lane changing preparation pose of the vehicle on the first lane based on the yaw angle, the safe distance of the vehicle to the obstacle in front and the safe distance of the vehicle to the lane boundary.

The functions of units, modules or submodules of the apparatuses in embodiments of the present disclosure may refer to the method embodiments, which are not repeated here.

According to embodiments of the present disclosure, the present disclosure further provides an electronic device, a readable storage medium and a computer program product.

According to an embodiment of the present disclosure, the present disclosure further provides a vehicle including the electronic device in embodiments of the present disclosure.

Figure 10:
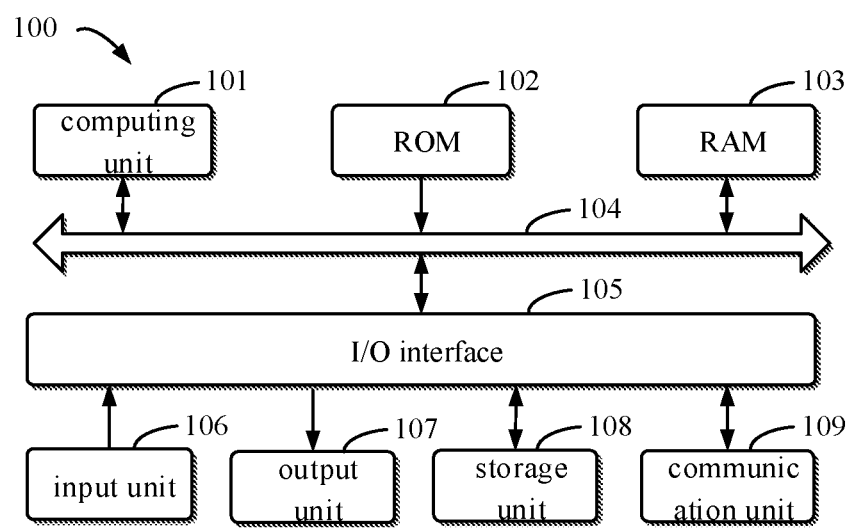
FIG. 10 is a block diagram illustrating an electronic device configured to implement a method for controlling lane changing according to embodiments of the present disclosure.

FIG. 10 is a schematic block diagram illustrating an example electronic device 100 in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 10, an electronic device 100 includes a computing unit 101, configured to execute various appropriate actions and processes according to a computer program stored in a read-only memory (ROM) 102 or loaded from a memory unit 108 to a random access memory (RAM) 103. In a RAM 103, various programs and data required for an electronic device 100 may be stored. A computing unit 101, a ROM 102 and a RAM 103 may be connected with each other by a bus 104. An input/output (I/O) interface 105 is also connected to a bus 104.

A plurality of components in the device 100 are connected to an I/O interface 105, and includes: an input unit 106, for example, a keyboard, a mouse, etc.; an output unit 107, for example various types of displays, speakers; a storage unit 108, for example a magnetic disk, an optical disk; and a communication unit 109, for example, a network card, a modem, a wireless transceiver. The communication unit 109 allows the electronic device 100 to exchange information/ data through a computer network such as internet and/or various types of telecommunication networks and other devices.

A computing unit 101 may be various types of general and/or dedicated processing components with processing and computing ability. Some examples of a computing unit 101 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. A computing unit 101 executes various methods and processes as described above, for example, a method for controlling lane change. For example, in some embodiments, the method for controlling lane change may be further implemented as a computer software program, which is physically contained in a machine readable medium, such as a storage unit 108. In some embodiments, a part or all of the computer program may be loaded and/or installed on the electronic device 100 through a ROM 102 and/or a communication unit 109. When the computer program is loaded on a RAM 103 and executed by a computing unit 101, one or more blocks in the method for controlling lane change as described above may be performed. Alternatively, in other embodiments, a computing unit 101 may be configured to perform a method for controlling lane change in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SoC), a complex programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of multiple programming languages. These programming languages may be provided to a processor or a controller of a general purpose computer, a dedicated computer, or other programmable apparatuses for controlling lane change so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, and further may be a server with a distributed system, or a server in combination with a blockchain.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for controlling lane changing, implemented by an autonomous driving system of a vehicle, comprising:
   predicting a target pose of the vehicle changed to a second lane based on a current pose of the vehicle on a first lane in response to a trigger of changing the vehicle from the first lane to the second lane;
   determining a lane changing preparation pose of the vehicle on the first lane based on the target pose, a minimum turning radius of the vehicle and at least one safe distance parameter of the vehicle; and
   performing lane changing of the vehicle based on the lane changing preparation pose.

2. The method of claim 1, wherein the at least one safe distance parameter comprises a safe distance of the vehicle to an obstacle in front;
   determining the lane changing preparation pose of the vehicle on the first lane based on the target pose, the minimum turning radius of the vehicle and the at least one safe distance parameter of the vehicle comprises:
   determining a minimum longitudinal distance of turning for the vehicle based on the minimum turning radius of the vehicle;
   determining a minimum longitudinal distance between the vehicle and the obstacle in front based on the minimum longitudinal distance of turning for the vehicle and the safe distance of the vehicle to the obstacle in front; and
   determining the lane changing preparation pose of the vehicle on the first lane based on the minimum longitudinal distance between the vehicle and the obstacle in front and the target pose.

3. The method of claim 2, wherein determining the minimum longitudinal distance of turning for the vehicle based on the minimum turning radius of the vehicle comprises:
   determining a first circle of the vehicle tangent to a preset straight pose based on the preset straight pose of the vehicle on the first lane and the minimum turning radius of the vehicle;
   determining a second circle based on a center of the first circle and a farthest distance of the center of the first circle to a head of the vehicle;
   determining a straight line perpendicular to a speed direction corresponding to the preset straight pose and tangent to the second circle based on the second circle and the speed direction; and
   determining the minimum longitudinal distance of turning for the vehicle based on a perpendicular distance between the straight line and the head of the vehicle.

4. The method of claim 1, wherein, the at least one safe distance parameter comprises a safe distance of the vehicle to an obstacle in front and a safe distance of the vehicle to a lane boundary;
   determining the lane changing preparation pose of the vehicle on the first lane based on the target pose, the minimum turning radius of the vehicle, and the at least one safe distance parameter of the vehicle comprises:
   determining a third circle of the vehicle tangent to the target pose based on the target pose and the minimum turning radius of the vehicle;
   determining a straight lane changing trajectory of the vehicle tangent to the third circle based on the third circle, the safe distance of the vehicle to the obstacle in front and the safe distance of the vehicle to the lane boundary; and determining the lane changing preparation pose of the vehicle on the first lane based on the straight lane changing trajectory, the safe distance of the vehicle to the obstacle in front, and the safe distance of the vehicle to the lane boundary.

5. The method of claim 4, wherein determining the lane changing preparation pose of the vehicle on the first lane based on the straight lane changing trajectory, the safe distance of the vehicle to the obstacle in front, and the safe distance of the vehicle to the lane boundary comprises:

determining a yaw angle in the lane changing preparation pose of the vehicle on the first lane based on the straight lane changing trajectory; and determining a coordinate of a center point of a rear axle in the lane changing preparation pose of the vehicle on the first lane based on the yaw angle, the safe distance of the vehicle to the obstacle in front and the safe distance of the vehicle to the lane boundary.

6. An apparatus for controlling lane changing, comprising:

at least one processor; and a memory communicatively connected to the at least one processor; wherein, the memory is stored with instructions executable by the at least one processor, and the instructions are executed by the at least one processor, to cause the at least one processor to perform:

predicting a target pose of a vehicle changed to a second lane based on a current pose of the vehicle on a first lane in response to a trigger of changing the vehicle from the first lane to the second lane;

determining a lane changing preparation pose of the vehicle on the first lane based on the target pose, a minimum turning radius of the vehicle and at least one safe distance parameter of the vehicle; and performing lane changing of the vehicle based on the lane changing preparation pose.

7. The apparatus of claim 6, wherein the at least one safe distance parameter comprises a safe distance of the vehicle to an obstacle in front;

the at least one processor is configured to perform:

determining a minimum longitudinal distance of turning for the vehicle based on the minimum turning radius of the vehicle;

determining a minimum longitudinal distance between the vehicle and the obstacle in front based on the minimum longitudinal distance of turning for the vehicle and the safe distance of the vehicle to the obstacle in front; and determining the lane changing preparation pose of the vehicle on the first lane based on the minimum longitudinal distance between the vehicle and the obstacle in front and the target pose.

8. The apparatus of claim 7, wherein at least one processor is configured to perform:

determining a first circle of the vehicle tangent to a preset straight pose based on the preset straight pose of the vehicle on the first lane and the minimum turning radius of the vehicle;

determining a second circle based on a center of the first circle and a farthest distance of the center of the first circle to a head of the vehicle;

determining a straight line perpendicular to a speed direction corresponding to the preset straight pose and tangent to the second circle based on the second circle and the speed direction; and determining a minimum longitudinal distance of turning for the vehicle based on a perpendicular distance between the straight line and the head of the vehicle.

9. The apparatus of claim 6, wherein the at least one safe distance parameter comprises a safe distance of the vehicle to an obstacle in front and a safe distance of the vehicle to a lane boundary;

the at least one processor is configured to perform:

determining a third circle of the vehicle tangent to the target pose based on the target pose and the minimum turning radius of the vehicle;

determining a straight lane changing trajectory of the vehicle tangent to the third circle based on the third circle, the safe distance of the vehicle to the obstacle in front and the safe distance of the vehicle to the lane boundary; and determining the lane changing preparation pose of the vehicle on the first lane based on the straight lane changing trajectory, the safe distance of the vehicle to the obstacle in front, and the safe distance of the vehicle to the lane boundary.

10. The apparatus of claim 9, wherein the at least one processor is configured to perform:

determining a yaw angle in the lane changing preparation pose of the vehicle on the first lane based on the straight lane changing trajectory; and determining a coordinate of a center point of a rear axle in the lane changing preparation pose of the vehicle on the first lane based on the yaw angle, the safe distance of the vehicle to the obstacle in front and the safe distance of the vehicle to the lane boundary.

11. A non-transitory computer-readable storage medium having computer instructions stored thereon, wherein the computer instructions are configured to cause a computer to perform:

predicting a target pose of a vehicle changed to a second lane based on a current pose of the vehicle on a first lane in response to a trigger of changing the vehicle from the first lane to the second lane;

determining a lane changing preparation pose of the vehicle on the first lane based on the target pose, a minimum turning radius of the vehicle and at least one safe distance parameter of the vehicle; and performing lane changing of the vehicle based on the lane changing preparation pose.

12. The storage medium of claim 11, wherein the at least one safe distance parameter comprises a safe distance of the vehicle to an obstacle in front;

determining the lane changing preparation pose of the vehicle on the first lane based on the target pose, the minimum turning radius of the vehicle and the at least one safe distance parameter of the vehicle comprises:

determining a minimum longitudinal distance of turning for the vehicle based on the minimum turning radius of the vehicle;

determining a minimum longitudinal distance between the vehicle and the obstacle in front based on the minimum longitudinal distance of turning for the vehicle and the safe distance of the vehicle to the obstacle in front; and determining the lane changing preparation pose of the vehicle on the first lane based on the minimum longitudinal distance between the vehicle and the obstacle in front and the target pose.

13. The storage medium of claim 12, wherein determining the minimum longitudinal distance of turning for the vehicle based on the minimum turning radius of the vehicle comprises:
- determining a first circle of the vehicle tangent to a preset straight pose based on the preset straight pose of the vehicle on the first lane and the minimum turning radius of the vehicle;
- determining a second circle based on a center of the first circle and a farthest distance of the center of the first circle to a head of the vehicle;
- determining a straight line perpendicular to a speed direction corresponding to the preset straight pose and tangent to the second circle based on the second circle and the speed direction; and
- determining the minimum longitudinal distance of turning for the vehicle based on a perpendicular distance between the straight line and the head of the vehicle.

14. The storage medium of claim 11, wherein, the at least one safe distance parameter comprises a safe distance of the vehicle to an obstacle in front and a safe distance of the vehicle to a lane boundary;
- determining the lane changing preparation pose of the vehicle on the first lane based on the target pose, the minimum turning radius of the vehicle, and the at least one safe distance parameter of the vehicle comprises:
  - determining a third circle of the vehicle tangent to the target pose based on the target pose and the minimum turning radius of the vehicle;
  - determining a straight lane changing trajectory of the vehicle tangent to the third circle based on the third circle, the safe distance of the vehicle to the obstacle in front and the safe distance of the vehicle to the lane boundary; and
  - determining the lane changing preparation pose of the vehicle on the first lane based on the straight lane changing trajectory, the safe distance of the vehicle to the obstacle in front, and the safe distance of the vehicle to the lane boundary.

15. The storage medium of claim 14, wherein determining the lane changing preparation pose of the vehicle on the first lane based on the straight lane changing trajectory, the safe distance of the vehicle to the obstacle in front, and the safe distance of the vehicle to the lane boundary comprises:
- determining a yaw angle in the lane changing preparation pose of the vehicle on the first lane based on the straight lane changing trajectory; and
- determining a coordinate of a center point of a rear axle in the lane changing preparation pose of the vehicle on the first lane based on the yaw angle, the safe distance of the vehicle to the obstacle in front and the safe distance of the vehicle to the lane boundary.

* * * * *